UNITED STATES PATENT OFFICE.

LUDWIG HAECKER, OF ALTENBURG, HUNGARY.

IMPROVEMENT IN BREWING WITH MAIZE.

Specification forming part of Letters Patent No. 40,836, dated December 8, 1863.

*To all whom it may concern:*

Be it known that I, LUDWIG HAECKER, of Altenburg, in the Kingdom of Hungary, have invented a new and useful Improvement in Brewing where Maize is Used; and I do hereby declare that the following is a full, clear, and exact description of the same.

It is well understood by brewers that in order to effect the dissolution and saccharification of barley-malt a temperature of about 160° to 165° Fahrenheit is required, and that when the temperature exceeds 170° the saccharifying property of the malt is rendered useless. The starch of Indian corn or maize, however, cannot be disclosed at a temperature lower than that of boiling water, and the attempts heretofore made to treat barley-malt and maize mixed together in the same mash-tub have failed, because the temperature required for the saccharification of the malt is not high enough to disclose the starch of the corn, and very little benefit is derived from the use of the corn; or if the temperature is raised high enough to disclose the starch of the corn the barley-malt is killed, and the whole process is a failure. At the same time it is impracticable to expose a quantity of maize without the addition of some malt suddenly to the influence of boiling water. By this operation a thick paste will form, which would obstruct the mash-tub and render the mashing impracticable.

To derive the full benefit of the maize used and effect the mashing in one vessel, (which is desirable, because in the breweries only one vessel exists,) is the object of present invention, which consists in the following process:

The first manipulation consists in making in the ordinary mash-tub a paste from corn-groats mixed with about from twelve to twenty per cent. of barley-malt. The temperature of the water used for this purpose ought not to exceed 120° Fahrenheit. After this paste has formed a current of boiling water is admitted slowly, and the whole mixture well mashed until the heat has risen to 165°, and after that the mashing is continued for a short time.

The second manipulation consists in adding boiling water to the mass in the mash-tub until the temperature reaches about from 180° to 200°. At this point the corn mass is left to stand at rest about an hour, and then I mash strongly, for the purpose of cooling down from about 168° to 158° Fahrenheit.

The third manipulation consists in adding slowly the remainder of the barley-malt, not allowing the temperature to go below 142°.

The proportion between the quantity of maize and that of the malt used in my process may be about from forty to fifty per cent., by weight.

After about an hour the first wort runs from the false bottom. The second wort can be made in the usual manner by using water at a temperature from 170° to 190°, and finally the third wort is to be prepared with water of a still higher temperature, according to the well-known practice in brewing.

Instead of making a second wort by using hot water, it is equally practicable to take from the mash the largest portion of the first wort, to pump it into the copper, and to boil it until clearness is effected. This hot liquid is now used for raising the heat of the remainder in the mash-tub to the proper temperature, which in using corn must not exceed 167° Fahrenheit. This method is called "clear mash"—lauter meïsch by German brewers. In order to complete the extraction, hot water is again applied. To finish the brewing process the worts are boiled with hops in the usual manner.

The advantage of my invention, which is pointed out in the three manipulations above referred to, will be readily understood from the following observations: In the first manipulation a certain portion of barley-malt is used for saccharifying that starch which is freed from the corn by the heat rising to 165°. By this process a thin liquor is formed, which allows the boiling water added at the second manipulation to have its full effect on the yet undisclosed starch of the corn. By raising the temperature in the second manipulation over 168° the saccharifying property of that small portion of barley-malt which has been mixed with the corn from the beginning is destroyed; but there is sufficient malt in the reserve to effect finally a perfect saccharification. Before proceeding to the third manipulation the corn mass must be cooled down to 168°, or less, in order to avoid every further alteration of the saccharifying property of the malt added to this manipulation. The saccharifying property of the second wort is weakened by the large quantity of water used for its preparation, and at the same time new particles of starch are set free by employing water of a temperature of 170° to 190°.

In order to avoid the disadvantage of introducing unchanged starch into the beer-wort, I keep either all the first wort, or at least one-third of it, at a temperature below 170° (thus preserving its saccharifying property) until the whole of the second or third wort is added. By this precaution I insure a perfect fining as well as the good keeping quality of the product.

It remains to remark that my process is applicable to all liquors in the manufacture of which Indian corn combined with barley-malt is used, and to all methods of brewing called "dick maisch," "wasser-maisch," and "lauter maisch" by German brewers.

What I claim as new, and desire to secure by Letters Patent, is—

1. The within-described process of disclosing the starch of corn and preparing the saccharified extract from corn mixed with barley-malt in about the proportion heretofore specified by the three manipulations substantially as set forth, said manipulations being conducted either in one and the same or in different vessels, as may be desirable.

2. Exposing maize, when the same is mixed with barley-malt about in the proportion herein specified, to the action of boiling water, substantially as and for the purpose set forth.

LUDWIG HAECKER.

Witnesses:
M. M. LIVINGSTON,
W. HAUFF.